United States Patent [19]

Moore et al.

[11] 4,405,572

[45] Sep. 20, 1983

[54] RECOVERY OF MOLYBDENUM

[75] Inventors: Calvin E. Moore; Mark E. Hutchinson; David S. Fetterman, all of Houston, Tex.

[73] Assignee: MorChem Products, Inc., Hoston, Tex.

[21] Appl. No.: 411,551

[22] Filed: Aug. 25, 1982

[51] Int. Cl.$^3$ ............................................. C01G 39/00
[52] U.S. Cl. ........................................ 423/54; 423/55; 423/56; 423/58
[58] Field of Search ........................ 423/54, 55, 56, 58

[56] References Cited

U.S. PATENT DOCUMENTS

| | | |
|---|---|---|
| 2,778,777 | 1/1957 | Powell . |
| 3,351,635 | 11/1967 | Kollar . |
| 3,463,604 | 8/1969 | Tave . |
| 3,763,303 | 10/1973 | Khuri et al. ............................ 423/54 |
| 3,819,663 | 6/1974 | Levine . |
| 4,140,588 | 2/1979 | Schmidt . |
| 4,315,896 | 2/1982 | Taylor et al. ........................ 423/54 |
| 4,317,801 | 3/1982 | Taylor et al. ........................ 423/54 |

FOREIGN PATENT DOCUMENTS 1317480  5/1973  United Kingdom .................. 423/54

*Primary Examiner*—Herbert T. Carter
*Attorney, Agent, or Firm*—Cushman, Darby & Cushman

[57] ABSTRACT

Molybdenum catalyst employed in the epoxidation of an olefin with an organic hydroperoxide preferably the epoxidation of propylene, is recovered from the bottoms fraction by adding aqueous alkaline material to the bottoms fraction and separating the aqueous phase. The molybdenum can be recovered from the aqueous phase by acidification and precipitating it as an insoluble compound.

20 Claims, No Drawings

RECOVERY OF MOLYBDENUM

BACKGROUND OF THE INVENTION

The present invention is directed to the recovery of molybdenum from the bottoms fraction in the epoxidation of olefins, especially the epoxidation of propylene with an organic hydroperoxide.

Powell U.S. Pat. No. 2,778,777 discloses treating crude petroleum containing small amounts of water insoluble molybdenum compounds by treating the petroleum with dilute sulfuric acid to form water soluble metal salts, forming an aqueous phase and separating the purified oil from the aqueous phase. No mention is made of the problem of separation of molybdenum from the bottoms fraction in the epoxidation of an olefin or in separation from a mixture containing alcohols, esters, and ethers.

Kollar U.S. Pat. No. 3,351,635 is the basic patent on the preparation of an epoxide by the reaction of an olefin, e.g. propylene, with an organic hydroperoxide employing a molybdenum catalyst. Thereby there are obtained the epoxide, e.g. propylene oxide, and the alcohol corresponding to the hydroperoxide, e.g. t-butyl alcohol if the hydroperoxide is t-butyl hydroperoxide. However, Kollar makes no mention of the bottoms material or of recovery molybdenum. The entire disclosure of Kollar is hereby incorporated by reference and relied upon.

Tave U.S. Pat. No. 3,463,604 is directed to the recovery of molybdenum from a molybdenum containing organic solution obtained from the bottoms fraction of the reaction product of an organic soluble molybdenum compound catalyzed olefin epoxidation process by contacting the molybdenum containing organic solution with an aqueous ammonium phosphate solution with a mole ratio of ammonium phosphate to molybdenum in the range of 0.8:1 to 2.0:1 and the concentration of water in the range of about 4 to 5 weight percent based on the molybdenum containing organic solution and the ammonium phosphate solution to precipitate ammonium phosphomolybdate. Tave points out that if the bottoms containing organic stream is alkaline it should be made acidic, column 3, lines 54–65. There is no mention made of forming a separate aqueous phase and in fact the contrary is indicate on column 4, lines 36–47. The entire disclosure of Tave is hereby incorporated by reference and relied upon.

Levine U.S. Pat. No. 3,819,663 is directed to a process for the epoxidation of an olefin compound with an organic hydroperoxide in the presence of a molybdenum epoxidation catalyst in which after removal of the product fraction the heavy liquid fraction containing the molybdenum catalyst is subjected to a wiped film evaporation at 375° to 450° F. to remove 60 to 85% by weight of the fraction as overhead, optionally further heating to 550° to 650° F., and recycling the evaporation residue to the epoxidation. This procedure necessary destroys a part of the heavy organics and does not truly separate the molybdenum values, e.g. they will contain carbonaceous material according to Example 5. The entire disclosure of Levine is hereby incorporated by reference and relied upon.

Schmidt U.S. Pat. No. 4,140,588 shows the use of water as an extractive distillation agent in the separation of methanol and acetone from propylene oxide made by the Kollar process. Schmidt also mentions various materials formed in the reaction and other methods tried for purification, e.g. column 1, line 5 to column 2, line 9.

SUMMARY OF THE INVENTION

It has now been found that the molybdenum catalyst employed in the epoxidation of an olefin with an organic hydroperoxide, preferably the epoxidation of propylene, most preferably with t-butyl hydroperoxide is recovered from the bottoms fraction by adding aqueous alkaline material to the bottoms fraction and separating the aqueous phase. The molybdenum can be recovered from the aqueous phase by acidification and precipitating it as an insoluble compound.

The bottoms fraction is a complex mixture of materials including alcohols, esters, ethers, acids, glycols and polymeric combinations of such materials. The art cited above mentions some of the materials. Thus in the epoxidation of propylene using t-butyl hydroperoxide there are present in the bottoms t-butyl alcohol, propylene glycol, dipropylene glycol, mono tertiary butyl ether of propylene glycol, acetic acid, formic acid, and higher molecular weight products. The bottoms fraction in the epoxidation of propylene usually has an average molecular weight of about 200. (Tave mentions a range of about 110 to about 300 for the molecular weight of the compounds present.) The alcohol present in the bottoms will depend on the hydroperoxide employed.

In addition to the oxygenated organic chemicals mentioned above the bottoms contains as a contaminant, molybdenum in the form of molybdenum compounds or in organic complexes (ligands) of molybdenum. These molybdenum materials are generally soluble in the liquid bottoms.

The purpose of the present invention is to remove or substantially reduce the molybdenum from the organics, recover the molybdenum, and improve the quality of the remaining organic material.

It has been found by experimentation that molybdenum can be recovered and/or separated from the oxygenated organic material, if the following conditions are met:

1. The molybdenum contaminated oxygenated organic material is raised to a pH of between 7.5 and 14 by addition of a base such as ammonium hydroxide, sodium hydroxide or potassium hydroxide or other base sufficiently soluble in water to give the required pH. The pH is preferably at least 9, most preferably 9 to 10.

2. After or during the raising the pH, a sufficient quantity of water is added to cause the mixed material to separate into two or more phases. Usually there is employed at least 50% water based on the total volume of water and bottoms. The phases normally consist of an organic phase and a water phase. The organic phase contains a little water and a small quantity of dissolved molybdenum, and the water phase usually contains approximately 18 to 35 percent organics, and most of the molybdenum, as well as some inorganic salts. After thorough mixing of the water with the bottoms and phase separation, the water phase is drained off for further processing. The organic phase is dried by supplying heat and stored for future sale or use.

It has been further determined by experimentation that the organics which are dissolved in the water phase can be recovered by lowering the pH of the water phase to the acid side of neutral. When the required pH is reached, two phases are again formed and consist of an oil phase and a water phase. The pH level required depends upon the raw material composition and varies between 6.9 and 0.5. There can be used any conventional acid for this purpose, e.g. hydrochloric acid or sulfuric acid. Upon phase separation the acid water phase is drained off for further processing to remove the molybdenum and inorganic salt. The oil is saved for sale or additional processing. The molybdenum remaining in the acid water stream is treated to form an insoluble molybdenum compound, which can be removed by solids handling techniques.

The acid solution containing molybdenum can be treated to recover the molybdenum, e.g. by passing the solution through a cation exchange resin or by precipitating the molybdenum in other ways, e.g., the solution can be treated with hydrogen sulfide to form insoluble molybdenum sulfide or it can be treated with phosphoric acid to form insoluble molybdenum phosphate or it can be treated with aqueous calcium chloride to form insoluble calcium molybdate. After precipitation the molybdenum compounds can be recovered by filtration or centrifuging.

While the process is preferably employed in recovering molybdenum and purifying bottoms in the epoxidation of propylene with t-butyl hydroperoxide, it can also be employed in purifying bottoms containing molybdenum obtained from the epoxidation of propylene with other hydroperoxides as shown for example in Kollar or with the epoxidation of other olefins, also as shown in Kollar.

The process can comprise, consist essentially of, or consist of the stated steps with the material set forth.

EXAMPLE 1

A mixture containing oxygenated compounds including alcohols, esters and ethers and approximately 1% molybdenum is generated commercially as a bottoms residuum in the production of propylene oxide by reacting propylene with t-butyl hydroperoxide. To 100 ml of this mixture, 100 ml of water and sufficient 50% caustic soda solution to bring the pH to 9–10 are added and the resultant mixture is agitated for fifteen minutes. This fluid is then placed in a separatory funnel and allowed to settle for one hour. A sharp phase separation occurs with a dark brown to black organic phase appearing on top of an amber colored aqueous phase. The aqueous phase is drawn off the bottom. The organic phase, representing approximately 60% of the total volume, is then heated to flash off any entrained water and subsequently analyzed for fuel or chemical value.

The aqueous phase is placed in a stirred beaker. Phosphoric acid is slowly added until a pH of 5.5 is attained. Stirring is continued for 15 minutes after which time the resultant precipitate is filtered under vacuum and recovered to obtain the molybdenum. To the filtrate 20% by volume of an extractant, such as normal butanol, is added. This mixture is stirred for 15 minutes and allowed to settle in a separatory funnel. Phase separation occurs leaving an organic top phase and an aqueous bottom phase. The top phase is analyzed for fuel or chemical value while the bottom is discarded.

EXAMPLE 2

A mixture of 150 ml of the oxygenated compound bottoms fraction from the epoxidation of propylene with t-butyl hydroperoxide and containing approximately 0.7% molybdenum was mixed with 150 ml of 5% $NH_4OH$ and agitated for 30 minutes. The heat of reaction was such that the solution temperature rose 12° C. The mixture was allowed to settle in a separatory funnel and separated into two phases. The lower, aqueous phase, a dark red liquor, contained the "new oil" (oxygenated compounds) in 200 cc of liquid. The upper phase of oil was 100 cc. This liquid was found to be completely miscible with normal oils. The aqueous phase was acidized with 31% HCl to a pH of 3. A brown precipitate occurred and was filtered from this solution to recover molybdenum. The water was boiled off the aqueous solution leaving a second oil phase.

EXAMPLE 3

The bottoms mixture of molybdenum containing oil from the epoxidation of propylene with t-butyl hydroperoxide was mixed with an equal volume of 5% sodium hydroxide. After mixing, the solution was placed in a separatory funnel and allowed to settle. The lower phase was a dark red aqueous solution and the upper phase a black oil. The two phases were separated and treated separately. The oil phase was distilled at 70 mm Hg. The initial overhead of water and light oils was collected. A total of 10% of the light ends were collected overhead while the bottoms temperature rose to 140° C. The resulting bottoms were analyzed to determine oil properties and found to be an excellent pour point depressant for fuel oil with a very much higher value than the feed (18,000 BTU/# vs. 12,500 BTU/#).

The aqueous phase was treated with phosphoric acid. At a pH of 5.5 a brown precipitate was formed. The solids were separated out and found to be sodium phosphomolybdate. The remaining liquid was acidified to a pH of 2 and an oil phase formed on top representing what appeared to be a large part of the soluable oil. A distillation of the remaining water phase showed the presence of alcohol type materials which could be removed from the water.

EXAMPLE 4

A 300 cc sample of the molybdenum containing bottoms stream from the epoxidation of propylene with t-butyl hydroperoxide was completely homogeneous. After sitting, there was no phase separation. The solution was mixed with another 270 cc of water and the mixture separated into an oil phase of 150 cc and an aqueous phase of 450 cc. The molybdenum content of the oil originally at 0.8% was reduced to 135 ppm.

The aqueous phase was treated with $H_2SO_4$ to bring the pH down to 2. The liquid phase again separated into an oil phase of 90 cc and an aqueous phase of 410 cc. The oil was found to be an excellent fuel of 18,000 BTU/#.

Hydrogen sulfide was bubbled into the aqueous phase and molybdenum sulfides were precipitated out. These were filtered off from the liquid and air dried. Analysis showed the solid material to contain most of the original molybdenum. The filtrate was saved for recycle.

EXAMPLE 5

One liter of bottoms from the epoxidation of propylene with t-butyl hydroperoxide and containing molybdenum and having a pH of 6 was raised to a pH of 8 with 50% NaOH. After sitting with no phase separation, aqueous filtrate from previous experiments containing the dissolved salts was added amounting to a total of 0.9 liter of water per liter of original charge. This caused the water-oil layer to separate from the oil layer. A 500 ml volume of oil was recovered.

The aqueous phase of 1.5 liters was acidized with 50% $H_2SO_4$ to a pH of 2. An oil phase of 400 cc formed on top accounting for 90% of the oil feed. The remaining aqueous phase was isolated and $(NH_4)_2S$ added to the liquid. Molybdenum sulfide precipitated. The solution was neutralized to a pH of 7 with sodium hydroxide and filtered. The resulting solids were oil free and easily washed with water. The dry fine particles flowed easily.

What is claimed is:

1. A method for separating molybdenum from the liquid organic oxygen compound containing bottoms fraction of a molybdenum catalyzed olefin epoxidation process comprising adding aqueous alkaline material to the bottoms fraction in an amount sufficient to form an upper first organic phase and a lower alkaline aqueous phase, separating the organic phase from the aqueous phase, the amount of aqueous alkaline material being sufficient to provide a pH of 7.5 to 14 in the lower aqueous phase, acidifying the alkaline aqueous phase after separation from the first organic phase to precipitate the molybdenum, forming a second upper organic phase and a lower aqueous phase, separating the second upper organic phase, and recovering the second organic phase.

2. A method according to claim 1 wherein the olefin is propylene.

3. A method according to claim 2 wherein the propylene is epoxidized with t-butyl hydroperoxide.

4. A method according to claim 3 wherein the molybdenum is precipitated as molybdenum sulfide, molybdenum phosphate or calcium molybdate.

5. A method according to claim 3 wherein there is employed at least about as much water as bottoms fraction by volume.

6. A method according to claim 5 wherein the alkaline material is employed in an amount sufficient to provide a pH of at least 9 in the lower aqueous phase.

7. A method according to claim 6 including the step of acidifying the alkaline aqueous phase to a pH of from 0.5 to 6.9 after separation from the aqueous phase.

8. A method according to claim 5 including the step of acidifying the alkaline aqueous phase to a pH of from 0.5 to 6.9 after separation from the aqueous phase.

9. A method according to claim 2 wherein there is employed at least about as much water as bottoms fraction by volume.

10. A method according to claim 9 including the step of acidifying the alkaline aqueous phase to a pH of from 0.5 to 6.9 after separation from the aqueous phase.

11. A method according to claim 1 including the step of acidifying the alkaline aqueous phase to a pH of from 0.5 to 6.9 after separation from the aqueous phase.

12. A method according to claim 11 wherein the acidification is to a pH not above 5.5.

13. A method according to claim 12 wherein the alkaline material employed is sufficient to provide a pH of 9 to 10 in the lower aqueous phase.

14. A method according to claim 1 wherein there is employed at least about as much water as bottoms fraction by volume.

15. A method according to claim 1 wherein there is employed at least about as much water as bottoms fraction by volume and the acidification is to a pH not above 5.5.

16. A method according to claim 15 wherein in the acidification the pH is not above 2 and the second upper organic phase is formed simultaneously with the precipitation of the molybdenum.

17. A method according to claim 1 wherein in the acidification the pH is not above the 2 and the second upper organic phase is formed simultaneously with the precipitation of the molybdenum.

18. A method according to claim 1 wherein the acidification is carried out at a pH of 5.5, the precipitated molybdenum is removed, the remaining liquid is acidified to a pH of 2 to form said second upper organic phase and lower aqueous phase, and separating said second upper organic phase.

19. A method according to claim 1 wherein the acidification is to a pH of 0.5 to 3.

20. A method according to claim 19 wherein the acidification is to a pH of 0.5 to 2.

* * * * *